Figure 1:
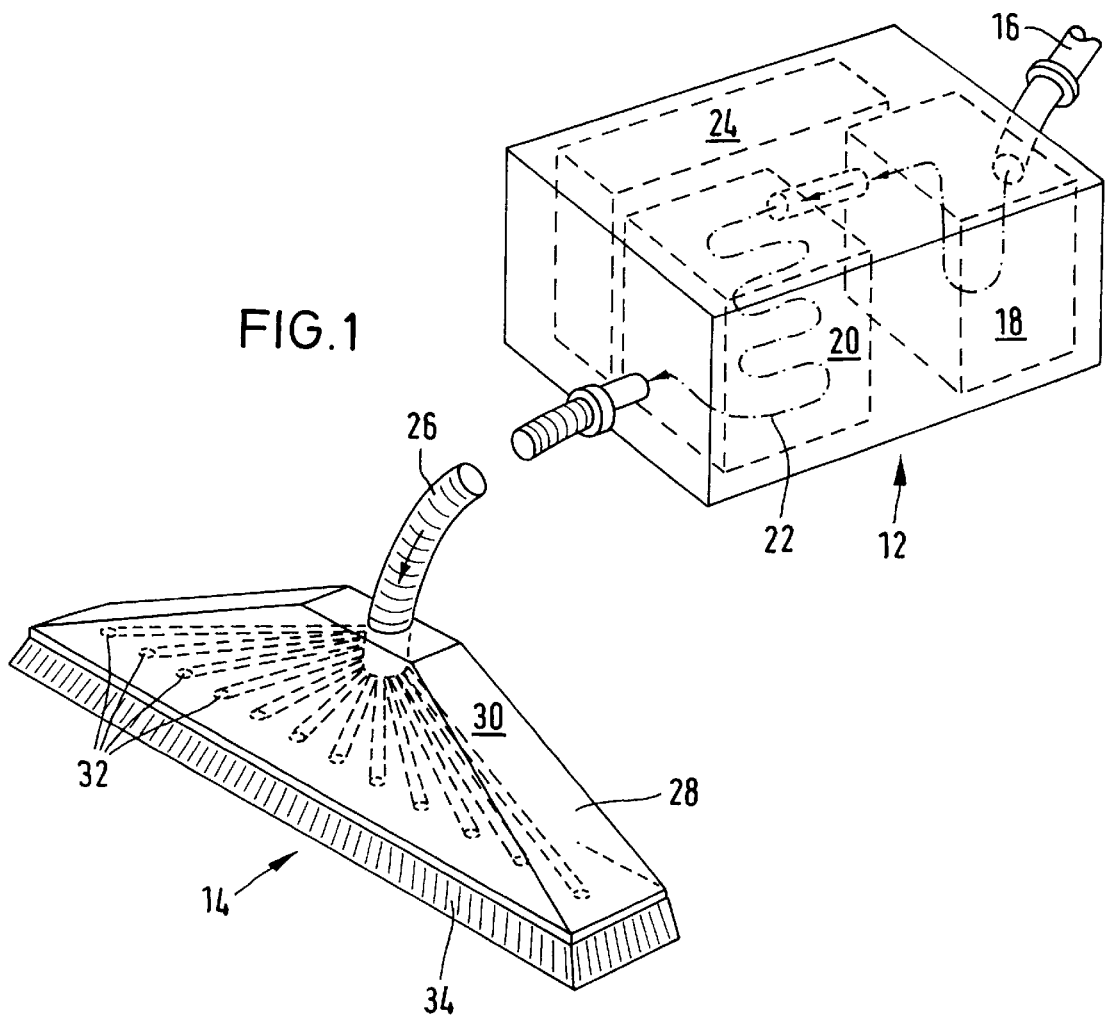

United States Patent
Görgens

[19]

[11] Patent Number: 6,073,859
[45] Date of Patent: Jun. 13, 2000

[54] PROCESS AND DEVICE FOR ELIMINATING WEEDS AND CLEANING SURFACES

[75] Inventor: Werner Görgens, Cologne, Germany

[73] Assignee: Werner Gorgens Consulting and Trading, Cologne, Germany

[21] Appl. No.: 09/142,880

[22] PCT Filed: Jan. 22, 1998

[86] PCT No.: PCT/EP98/00336

§ 371 Date: Sep. 18, 1998

§ 102(e) Date: Sep. 18, 1998

[87] PCT Pub. No.: WO98/32332

PCT Pub. Date: Jul. 30, 1998

[30] Foreign Application Priority Data

Jan. 28, 1997 [DE] Germany ............................ 197 04 971
Jul. 11, 1997 [DE] Germany ............................ 197 29 683

[51] Int. Cl.[7] ...................................................... B05B 1/24
[52] U.S. Cl. ............................ 239/13; 239/128; 239/130; 239/135; 239/136
[58] Field of Search .............................. 239/13–135, 172, 239/136

[56] References Cited

U.S. PATENT DOCUMENTS

| | | | |
|---|---|---|---|
| 1,042,688 | 10/1912 | Key ............................................ | 239/13 |
| 1,195,027 | 8/1916 | Jones ......................................... | 239/13 |
| 5,020,510 | 6/1991 | Jones ..................................... | 126/271.1 |
| 5,366,154 | 11/1994 | Thompson ................................ | 239/13 |

*Primary Examiner*—Kevin Shaver
*Assistant Examiner*—David Deal
*Attorney, Agent, or Firm*—Klauber & Jackson

[57] ABSTRACT

Weeds grow on the ballast of railway tracks, on sports fields, such as plastic running tracks, in parking lots and on cemetery paths. A machine is disclosed for eliminating them more economically. The weeds are sprayed with boiling water and steam at temperatures from 90° and 140°. A travelling device is used for that purpose having a water container, a heater device and spraying nozzles. When heated, the plant protein coagulates, and chlorophyll is totally or partially destroyed, causing the weeds to wither. The boiling water and steam can also be used to eliminate graffiti, oil traces and chewing gum from surfaces of all types, and thus to clean said surfaces.

12 Claims, 2 Drawing Sheets

PROCESS AND DEVICE FOR ELIMINATING WEEDS AND CLEANING SURFACES

Process and apparatus for eliminating weeds and cleaning surfaces The invention concerns a process and an apparatus for eliminating weeds and destroying seeds thereof with spraying of the weeds and the surface of the ground covered thereby, with superheated steam issuing from at least one nozzle at a temperature of at least 115° C. and a pressure of at least 7 bars. The process according to the invention and the apparatus according to the invention are also suitable for cleaning surfaces.

An apparatus is known (German utility model No 89 11 869) for eliminating weeds comprising a wheeled chassis with a frame which is held thereon at a predetermined height above the ground, with a gas burner which is carried on the frame and which is directed on to a metallic reflection surface. The reflection surface is heated by the gas burner to nearly 1000° C. The reflection surface reflects the heat in the form of infra-red radiation downwardly towards the ground and the weeds growing therein. The plants are heated to about a maximum of 70° by the infra-red radiation. The heat destroys the proteins in the plant cells and the plants wither. Destruction of the proteins in the plant cells cannot be immediately perceived by the eye. Some days can elapse until the weeds wither and decay. That time which elapses up to the moment of perceiving the result does not in any way alter the fact that the weeds are effectively destroyed and thus prevented from further growth. It can happen however that assistant workers operating with the known apparatus do not perceive that time factor. They observe the weeds prior to and after the treatment with the known apparatus and do not perceive any difference of substance in terms of their appearance. Therefore they set the gas burner or burners to a higher output. That can result in really burning the weeds. However it represents a wastage of energy. The burnt or singed weeds remain with their roots in the ground. That then has the result that they decay on the spot and fertilise the ground, which results in fresh vigorous growth with new weeds.

Effective operation of the known apparatus requires dry weather. In the case of damp weather or even rain the heat generated by the infra-red radiation at the surface of the weeds is used up by the latent heat to such an extent that the temperature required to destroy the proteins, of about 70° C., is not reached. When the known apparatus is used in gardens or parks in which that use is planned at the earliest on the day before, rain and the resulting non-usability of the known apparatus do not represent any difficulty. The German railway authorities however use maintenance or working trains consisting of several carriages for eliminating the weeds from the track ballast and the adjoining embankment strips. On many sections those working trains can only be used at night during hours involving a low level of rail traffic. Ascertaining or arranging for those hours involving a low level of traffic and the allocation of personnel for night working require forward planning of some weeks. It is now an awkward and expensive undertaking if such a working train cannot be used because of damp weather or rain.

When the known apparatus is used in Summer or in hot countries as in Southern Europe, there is also the risk of grass and forest fires. When travelling along sections of rail track with the above-mentioned working train or when treating large areas with an apparatus connected to a truck the treated surface can scarcely be observed and in particular not over a prolonged period of time after a treatment. It then happens that dry leaves, dried grasses or paper between the weeds is set on fire and begins to burn.

A process and an apparatus of the kind set forth in the opening part of this specification are known (WO 94/26102), in which hot water under pressure is discharged at a temperature of between 100° C. and 110° C. and under an increased pressure. That process and apparatus have not proven successful in a practical context. When the hot water impinges on the weed growth, it has cooled down to such an extent that it no longer damages and thus eliminates the growth. Also known are an apparatus and a process for so-called control of vegetation (U.S. Pat. No. 5,366,154) in which a liquid spray material is heated to temperatures of up to 115° C. and jetted under pressures of between about 7 and 280 $kg/cm^2$. It is stated in relation to that process that it makes it unnecessary to use chemicals for killing off plants. It is to be assumed however that the so-called liquid spray material, by the time it impinges against the plants, has cooled down to such an extent that it adversely affects the biological existence thereof and the growth thereof, only to a slight degree. Also known is an apparatus for disinfecting and clearing ground surfaces (French patent specification No 1 187 477), in which water is heated up and blasted in the form of steam at a temperature of more than 100° C.

A common aspect of all known processes and apparatuses is that they do not effectively eliminate weeds and seeds thereof. That is simply because the hot water or the superheated steam, by the time that it impinges on the weeds, the ground and the seeds in the ground, has cooled down to such an extent that the biological existence of the plants and the growth thereof is not adversely affected or is adversely affected only to a slight degree.

Bearing that state of the art in mind, the object of the present invention is to provide a process of the kind set forth in the opening part of this specification, such that the weeds are effectively eliminated and the seeds thereof are destroyed and surfaces can be cleaned. The invention also aims to provide that the process can also be used in damp weather and possibly also when there is rain. The invention seeks to provide that a risk of fire is completely eliminated.

In accordance with the invention that object is attained by a process in which superheated steam issues from the nozzle at such a temperature and such a pressure that it impinges on to the weeds or the surface of the ground at a temperature of at least 140° C. and a pressure of at least 60 bars. In that context the term ground means the earth on which the weeds are growing, or a surface to be cleaned. When the weeds are sprayed in that way the surface thereof is heated to the vegetation point of the weeds, which is in the higher strata or layers of the ground. The heating effect causes destruction of the chlorophyll and the protein contained in the cells of the weeds or plants is coagulated. The coagulated proteins pass into the roots and weaken them. When the plant cells are heated to temperatures of 70° or more the water contained in the cells has expanded to such a degree that the cells burst. All that then results in the plants withering. That withering is quickly perceived. The risk which occurs with the known apparatus of burning and wastage of energy does not occur.

In accordance with the invention it is provided that the vegetation point of the plant is heated by the superheated steam to at least 70°. As stated, that causes destruction of the chlorophyll and the water contained in the cells expands to such an extent that the cells burst. The crucial consideration is that the superheated steam impinging on the vegetation point of the plant cools there from its temperature of at least 140° C. to about 120° C. and the heat which is liberated in that case penetrates into the plant. As a result the protein coagulates and the chlorophyll is destroyed. In the state of the art the hot water and/or the superheated steam were merely blown undirectly towards the plant.

Desirably the superheated steam is sprayed into the upper layers or strata of the surface of the ground. In that case the superheated steam should be sprayed into the ground to a depth of about 10 mm. In that case the leaves and stems of the weeds are completely wetted with superheated steam. It has been found that the process according to the invention can be used at relatively low temperatures, unlike the previous treatment of the plants with infra-red radiation. That is explained by virtue of the fact that the superheated steam completely encloses or wets the plants and as a result they are heated more uniformly and to a greater degree than by the action of infra-red radiation. Accordingly the chlorophyll is also lastingly destroyed and the plant protein coagulates completely.

Steam is a better conductor of heat than air. Evidently this is a reason for the process according to the invention enjoying improved effectiveness. The superheated steam which is sprayed on to the plant surface possibly remains clinging there in the form of condensate. The heat stored in the steam then penetrates into the plants, destroys the chlorophyll and causes the proteins to coagulate. The time before cooling to about 70° C. occurs is available for that to happen. Air is a much poorer conductor of heat. Therefore the air which is heated when using the known apparatus only slowly gives off its heat to the plants.

It has been found that the seeds in the surface layers of the ground are also destroyed by the superheated steam. In that way ground can be made weed-free before it is freshly seeded.

As, unlike the known art, the process according to the invention operates with superheated steam and not with infra-red radiation, there is no longer any risk of fire. The process according to the invention can thus also be used without any danger in hot summers and in Southern countries in Europe and other hot countries.

The invention also provides an apparatus for carrying out the above-outlined process. This apparatus is distinguished by a supply container for water, a pressure pump connected thereto, a heating device for heating water to a temperature of between 900 and 1400, at least one nozzle for spraying superheated steam on to the surface of the ground and a conduit arrangement between the above-mentioned components.

Desirably the apparatus is arranged on a chassis. In that assembly a plurality of nozzles should be arranged in mutually juxtaposed relationship, secured jointly to a holding means, and connected to a short and heat-insulated feed conduit for the superheated steam. Desirably a plurality of nozzles are arranged in mutually juxtaposed relationship on a distributor rake. The heating device is desirably a continuous-flow heater. When the apparatus according to the invention is arranged on a chassis it can be hitched to a municipal street sprinkler vehicle. The apparatus can equally also be mounted to the front hydraulic assembly of a truck. When a plurality of nozzles mounted in mutually juxtaposed relationship on a distributor rake are used, they are desirably enclosed by an elastic curtain. The curtain concentrates the superheated steam on to a delimited surface area. As a result the heat contained in the superheated steam is used in its entirety.

Figure 2:
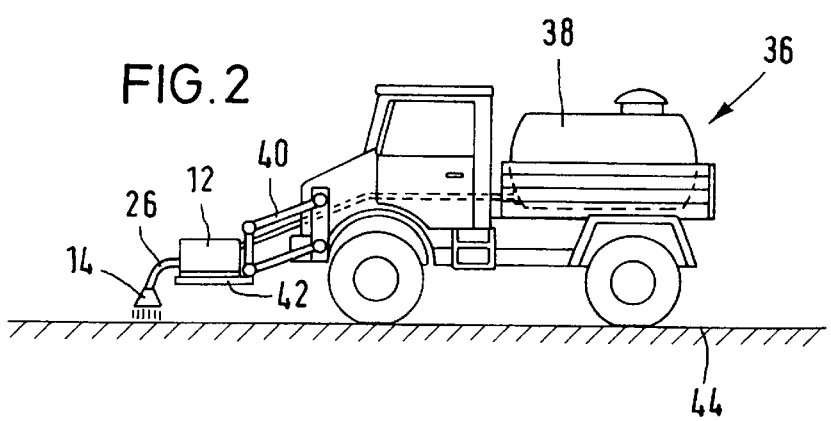
Figure 3:
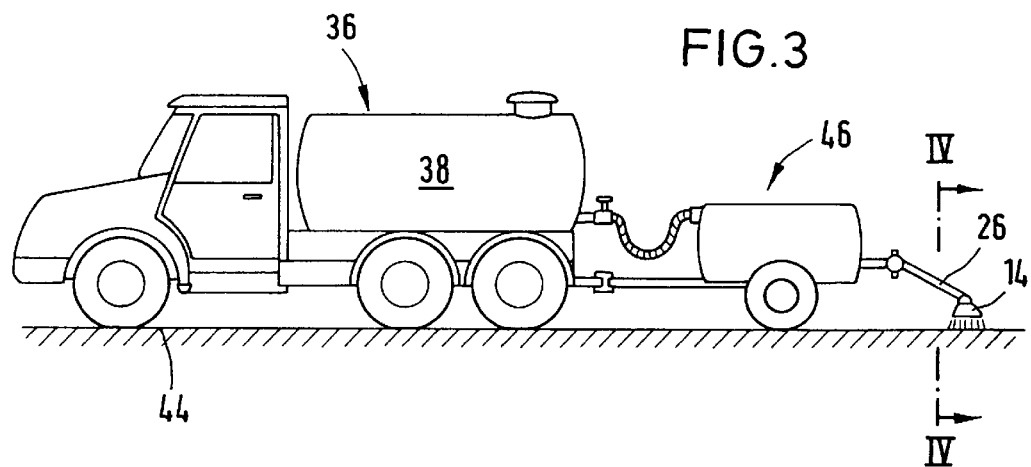
Figure 4:
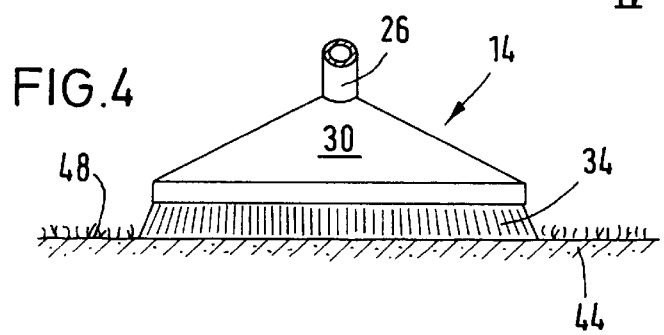
Figure 5:
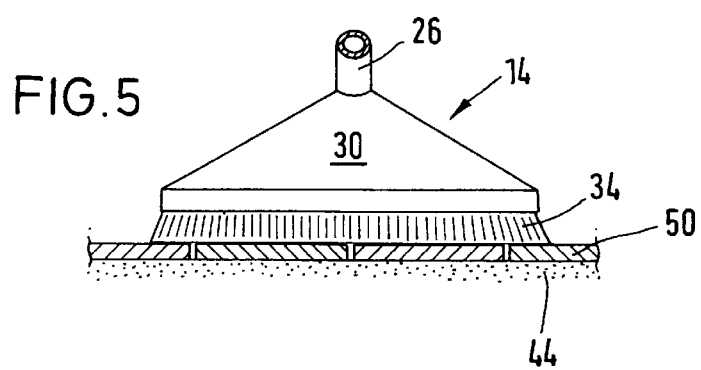
Figure 6:
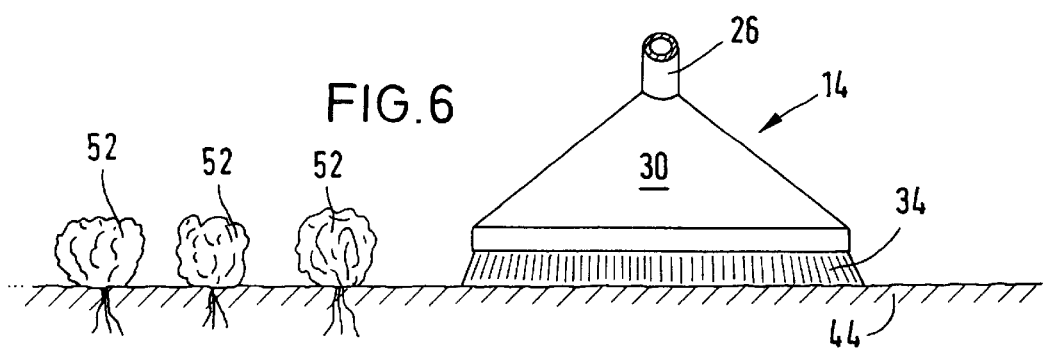

The invention will now be further described by means of the embodiments and examples of use illustrated in the drawing. The invention is described in terms of its use for eliminating weeds. In the drawing:

FIG. 1 is an exploded diagrammatic view of the apparatus according to the invention, FIG. 2 is a side view of an apparatus according to the invention mounted to the front hydraulic assembly of a municipal street sprinkler vehicle, FIG. 3 is a side view of an apparatus according to the invention arranged on a chassis and hitched to a municipal street sprinkler vehicle, FIG. 4 is a front view on an enlarged scale of a distributor rake when treating overgrown ground, FIG. 5 shows a front view on an enlarged scale of a distributor rake when treating ground paving slabs, and FIG. 6 is a front view on an enlarged scale of a distributor rake when treating the ground of a partially harvested hothouse.

Referring to the view shown in FIG. 1, the apparatus according to the invention comprises a box-shaped portion 12, also referred to as the hot box, and a movable portion 14. Water flows into the box-shaped portion 12 by way of a water feed 16. The water firstly passes through a pressure pump 18 and then passes into a continuous-flow heater 20. A conduit 22 is laid in a to-and-fro configuration in the heater 20. A supply of heating material, either oil or gas, is identified by reference numeral 24. The superheated steam leaves the box-shaped portion 12 by way of a hose 26. In actual fact that hose 26 is particularly short and heat-insulated. The hose 26 is not shown to scale in FIGS. 1 and 2. As can be deduced from the foregoing the hose 26 is shorter and more heavily heat-insulated than is shown in the Figures. That ensures that, on the way from the continuous-flow heater 20 to leaving the apparatus, the superheated steam does not cool down or scarcely cools down, and it leaves the apparatus at maximum temperature and under maximum pressure. The hose 26 opens into the movable portion 14 or the distributor rake 28. It has a housing 30, nozzles 32 arranged in mutually juxtaposed relationship therein and connected to the hose 26, and a curtain 34.

Looking at FIG. 2 the box-shaped portion 12 or hot box is arranged on the front part of a municipal street sprinkler vehicle 36. It has a water tank 38 and a so-called front hydraulic assembly 40. That term is used to denote a hydraulically pivotable lever assembly. It raises and lowers a lift plate 42 with the box-shaped portion 12 or hot box fixed thereon. Before use, the lift plate 42 is lowered to such an extent that the movable portion 14 with the distributor rake 28 is disposed at a short distance above the ground surface 44 to be treated. The water required for operation of the apparatus according to the invention is taken from the water tank 38. When the arrangement is not in use the lift plate 42 is raised.

Referring to FIG. 3, as shown therein the box-shaped portion 12 or the hot box is arranged on a trailer 46 which is towed by a sprinkler vehicle 36. The movable portion 14 or the distributor rake 28 is connected by a tube 26 to the box-shaped portion 12. The treated ground is identified by reference 44. FIG. 4 shows a rear view on a larger scale of the movable portion 14 and the distributor rake 28 when treating ground 40. FIG. 4 shows a view on a larger scale of the distributor rake 28 when treating the ground 44. FIG. 5 is a view on a larger scale of the movable portion 14 with the distributor rake 28 when treating ground paving or covering slabs 50. FIG. 6 is a view on a larger scale of the movable portion 14 with the distributor rake 28 when treating the ground 44 of a hothouse. FIG. 6 also shows some plants 52 (heads of lettuce) which are outside the area of the ground 44, which is being treated.

In operation of the apparatus according to the invention the water which is introduced by way of the water feed 16 is urged by the pressure pump 18 through the continuous-flow heater 20 with the conduit 22 extending in a helical configuration, it is heated therein to a temperature of between 90° and 140°, and it is then urged in the form of superheated steam by way of the hose 26 into the individual nozzles 32. They are guided over the surface to be treated. The superheated steam issues from the nozzles 32 and is sprayed on to the plants to be treated, a ground or ground paving slabs. The curtain 34 prevents superheated steam from flowing away without being purposefully used.

FIGS. 2 and 3 show examples of use for the treatment of streets and roads, parking lots, running tracks in stadia, cemetery paths and the like.

FIG. 4 shows in detail how the movable portion 14 with the distributor rake is guided over ground 44 which is overgrown with weeds. FIG. 5 shows the treatment of ground paving slabs 50. Moss, lichen and algae which occur in the surface pores and cracks of and in the gaps between the paving slabs 50 are destroyed. FIG. 6 shows the treatment of the harvested part of the ground 44 in a hothouse or another cultivation area. After the harvesting of for example lettuce heads 52, cabbage or another vegetable, the ground 44 is treated with the apparatus according to the invention. Seeds, remains of roots and seedlings in the ground are destroyed. That treatment, a kind of weeding operation, can be implemented more quickly and more inexpensively than by hand. It is also more careful than treatment with herbicides. The apparatus according to the invention can also be used to treat plastic running tracks, sporting facilities in general and the like, and eliminate moss, algae and in general growth, quickly, reliably and without harmful side-effects. Graffiti, traces of oil and chewing gum can also be removed quickly and reliably from surfaces of any kind with the invention and such surfaces can thus be cleaned thereby.

What is claimed is:

1. A process for eliminating weeds and destroying seeds thereof and cleaning surfaces with spraying of the weeds and the surface of the ground covered thereby with superheated steam and/or hot water issuing from at least one nozzle comprising issuing superheated steam from said at least one nozzle at such a temperature and such a pressure that it impinges on the weeds or the surface of the ground at a temperature of at least 140° C. and under a pressure of at least 60 bars.

2. A process as set forth in claim 1 characterised in that the vegetation point of the plant is heated to at least 70° C. by the superheated steam impinging thereon.

3. A process as set forth in claim 1 or claim 2 characterised in that the superheated steam is sprayed into the upper strata of the surface of the ground.

4. A process as set forth in claim 1 or claim 2 characterised in that the superheated steam is sprayed into the ground to a depth of 10 mm.

5. A process as set forth in claim 1 characterised in that leaves and stems of the weed plants are completely wetted with superheated steam.

6. Apparatus for eliminating weeds and destroying, seeds thereof and cleaning surfaces with spraying of the weeds and the surface of the ground covered thereby with superheated steam and/or hot water comprising a supply container for containing a supply of water, a pressure pump (18) connected thereto, a heating device (20) for heating water to a predetermined high temperature a plurality of nozzles in side by side relationship for spraying superheated steam on to the surface of the ground (44) and a short, highly insulated feed conduit interconnecting said heater with said plurality of nozzles to retain the water from said heater at a sufficiently high temperature to cause the superheated steam to impinge upon the weeds and the surface of the ground at a temperature of at least 140° C.

7. Apparatus as set forth in claim 6 characterised in that it is arranged on a trailer (46).

8. Apparatus as set forth in claim 6 characterised in that a plurality of nozzles (32) are arranged in side-by-side relationship on a distributor rake (28).

9. Apparatus as set forth in claim 6 characterised in that the heating device (20) is a continuous-flow heater.

10. Apparatus as set forth in claim 6 characterised in that it is hitched to a municipal street sprinkler vehicle (36).

11. Apparatus as set forth in claim 6 characterised in that it is mounted to the front hydraulic assembly (40) of a truck.

12. Apparatus as set forth in claim 6 characterised in that mounted on the distributor rake (28) is an elastic curtain (34) which encloses the nozzles (32).

* * * * *